United States Patent [19]

Quick

[11] 4,098,060
[45] Jul. 4, 1978

[54] SUGAR CANE HARVESTERS

[75] Inventor: Donald J. Quick, Bundaberg, Australia

[73] Assignee: Massey-Ferguson Services N.V., Curacao, Netherlands Antilles

[21] Appl. No.: 735,665

[22] Filed: Oct. 26, 1976

[30] Foreign Application Priority Data

Oct. 30, 1975 [GB] United Kingdom ............... 44789/75

[51] Int. Cl.² ........................................... A01D 45/10
[52] U.S. Cl. .................................................. 56/13.9
[58] Field of Search ................................ 56/13.6–13.9

[56] References Cited

U.S. PATENT DOCUMENTS

| 3,673,774 | 7/1972 | Mizzi | 56/13.9 |
| 3,942,307 | 3/1976 | Quick | 56/13.9 |
| 4,019,308 | 4/1977 | Quick | 56/13.9 |

*Primary Examiner*—Russell R. Kinsey
*Attorney, Agent, or Firm*—Robert L. Farris

[57] ABSTRACT

Sugar cane harvester has base twin contra-rotating cutters driven by flat profile gearboxes positioned above the base cutters within the throat of the harvester. The base cutters are positioned between the harvester's front wheels (as viewed in a horizontal direction at right angles to forward travel of the harvester) so that the cutting height is unaffected by pitching of the harvester when traversing uneven terrain.

10 Claims, 9 Drawing Figures

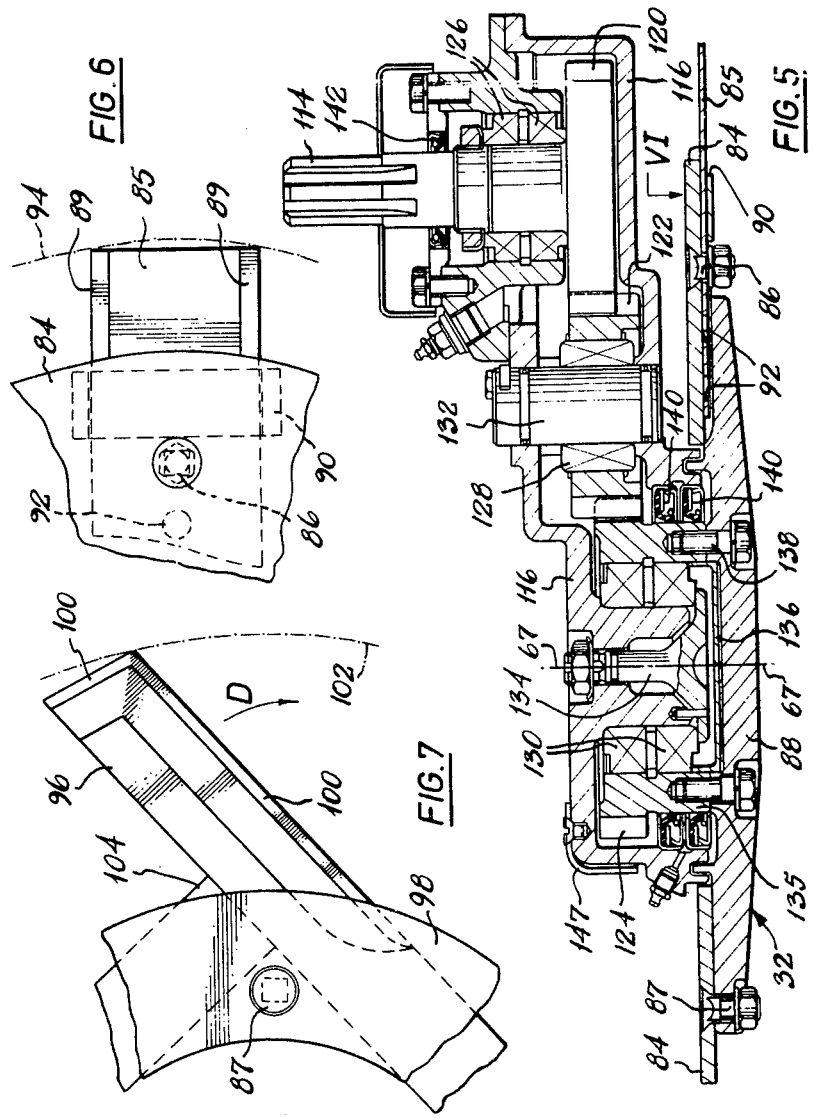

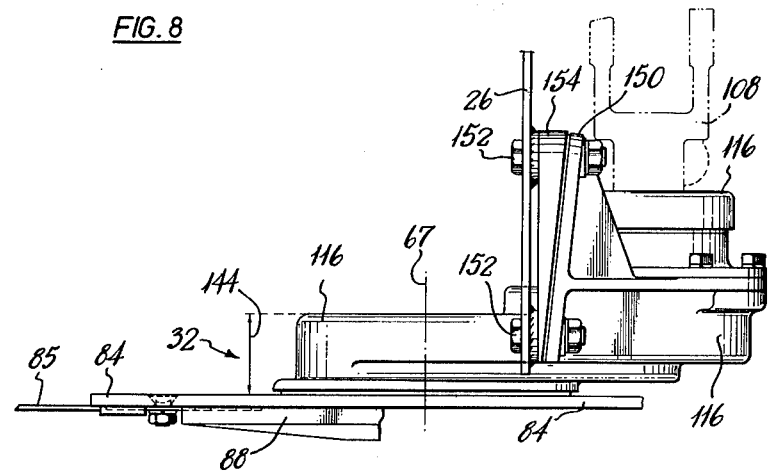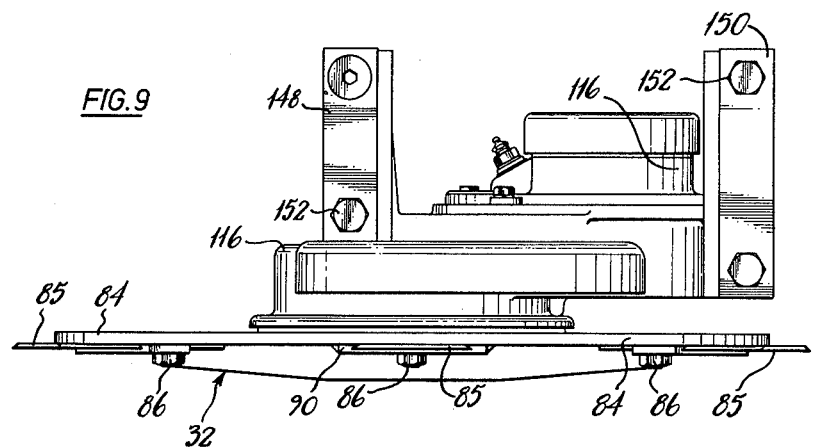

SUGAR CANE HARVESTERS

This invention relates to sugar cane harvesters and in particular to the base cutting apparatus of such harvesters, which severes the cane sticks from their roots.

In the case of sugar cane harvesters having walls defining a crop gathering throat at the front of the harvester and contra-rotatable base cutters positioned to sever the cane sticks from their roots as each row of cane passes into the throat, the base cutters have hitherto usually been positioned either in front of or behind the front wheels of the harvester.

This is because it is necessary for the cutting circles of the base cutters to touch or overlap in order for the cutters to effectively sever all the sticks. Consequently, in order to avoid the need to locate the cutters' large vertical drive shafts within the crop-gathering throat where they would obstruct the free flow of crop, the base cutters have hitherto usually been made large enough so that the drive shafts can be located outside the crop gathering throat. As a result, there has been insufficient room for the combined width of the two base cuttes between the front wheels of the harvester, because (for a two way cane harvester) the spacing of the front wheels is strictly limited in accordance with row spacing requirements.

A problem that arises from positioning the base cutters either in front of or behind the front wheels of the harvester is that vertical movement of the basecutters as the harvester traverses uneven ground is exaggerated. As a result, the base cutters sometimes dig into the ground too deeply thereby consuming too much power and feeding excessive quantities of earth into the harvester with the crop. At other times the basecutters are too high and cane sticks are severed well above ground level, thereby wasting valuable quantities of harvestable crop.

It is an object of the invention to provide a sugar cane harvester having base cutting means having improved ground contour following capability.

According to the invention there is provided a mobile sugar cane harvester comprising:

a pair of transversely-spaced walls defining a crop gathering throat at the front of the harvester;

ground-engageable support means at each side of said crop gathering throat;

a pair of rotatable base cutters having projecting blades positioned to sever sugar cane sticks from their roots as a row of cane passes into the throat; and a drive to rotate said base cutters;

characterized in that the axis of rotation of each base cutter lies between (as viewed in the direction of forward travel of the harvester) said walls defining the crop gathering throat; and said drive to rotate said base cutters includes drive transmission elements located within a pair of transmission housings positioned one immediately above or below each base cutter; and each of said transmission housings has a relatively flat profile; and said axes of rotation of said base cutters also lie between (as viewed in a horizontal direction at right angles to the direction of forward travel of the harvester) said ground-engageable support means.

An embodiment of the invention will now be described by way of example with reference to the accompanying drawings in which:

FIG. 5 shows a section on the line V—V in FIG. 4 through the base cutting means and its drive gearbox;

FIG. 6 shows a pln view, as indicated by arrow VI in FIG. 5, of a blade of the base cutting means;

FIG. 7 shows a plan view of an alternative blade for the base cutting means;

FIG. 8 shows the base cutting means in elevation, the direction of viewing being indicated by arrow VIII in FIG. 4; and FIG. 9 shows another elevation view of the base cutting means, the direction of viewing being indicated by arrow IX in FIG. 4.

FIG. 1 shows a sugar cane harvester 10 comprising the following main structural items:

Figure 1:
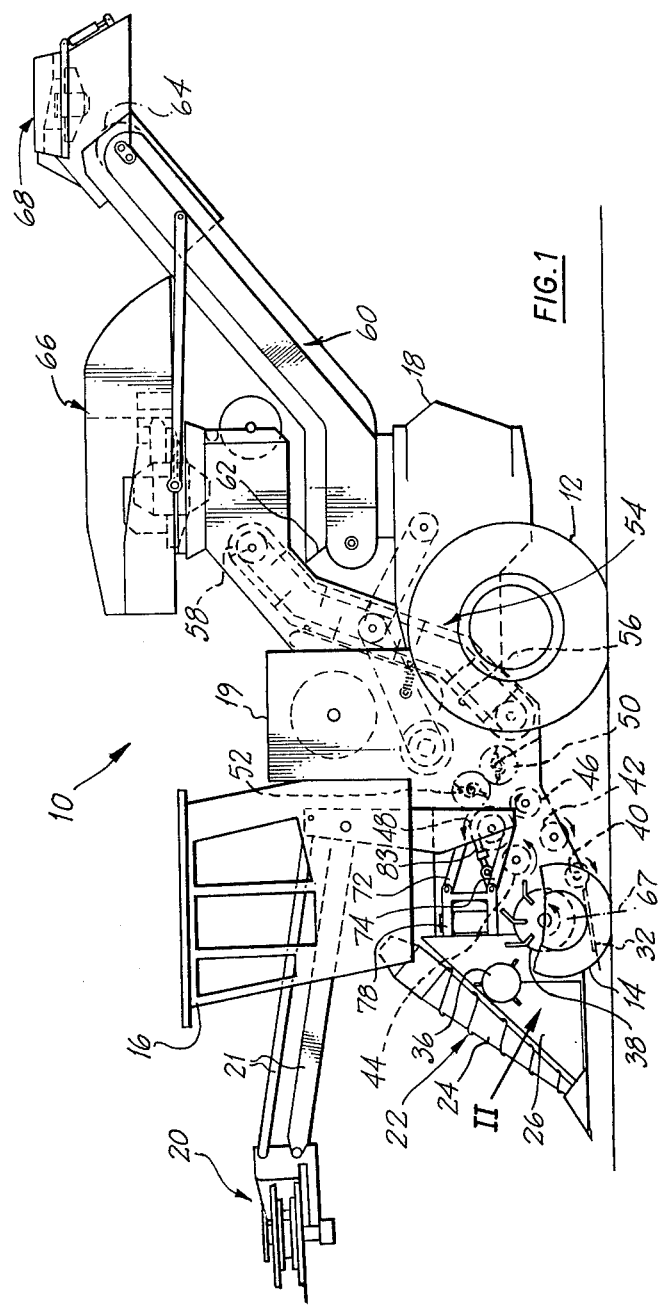
FIG. 1 shows a sugar cane harvester in side elevation, with some of its main internal components indicated by broken lines and others revealed by cutting away the harvester's superstructure.
Figure 2:
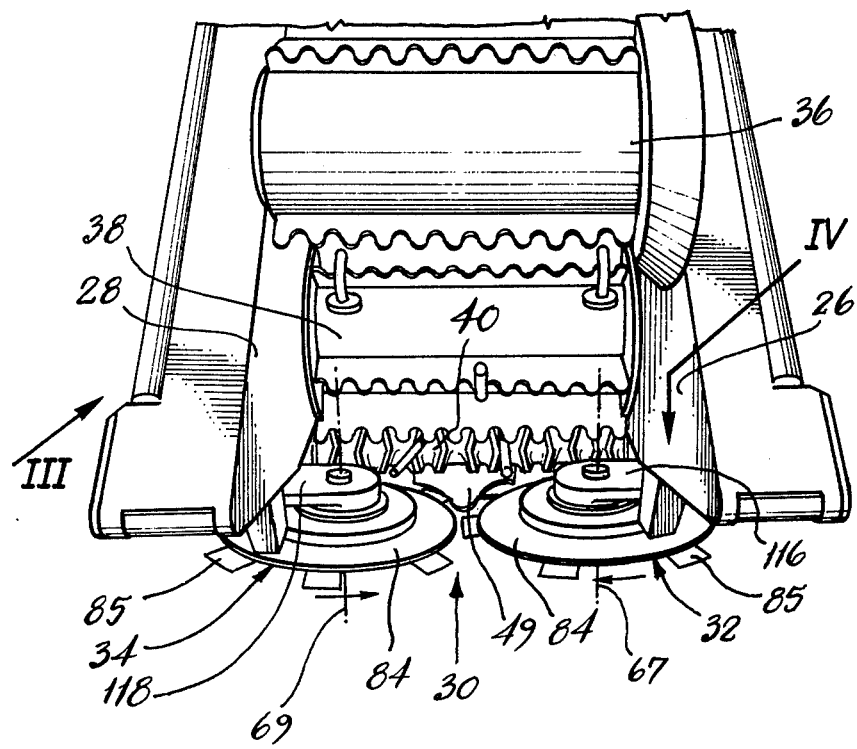
FIG. 2 shows a front elevation view as indicated by arrow II in FIG. 1 of a portion of the harvester with certain components including the forward portion of a crop gathering throat of the harvester removed.
Figure 3:
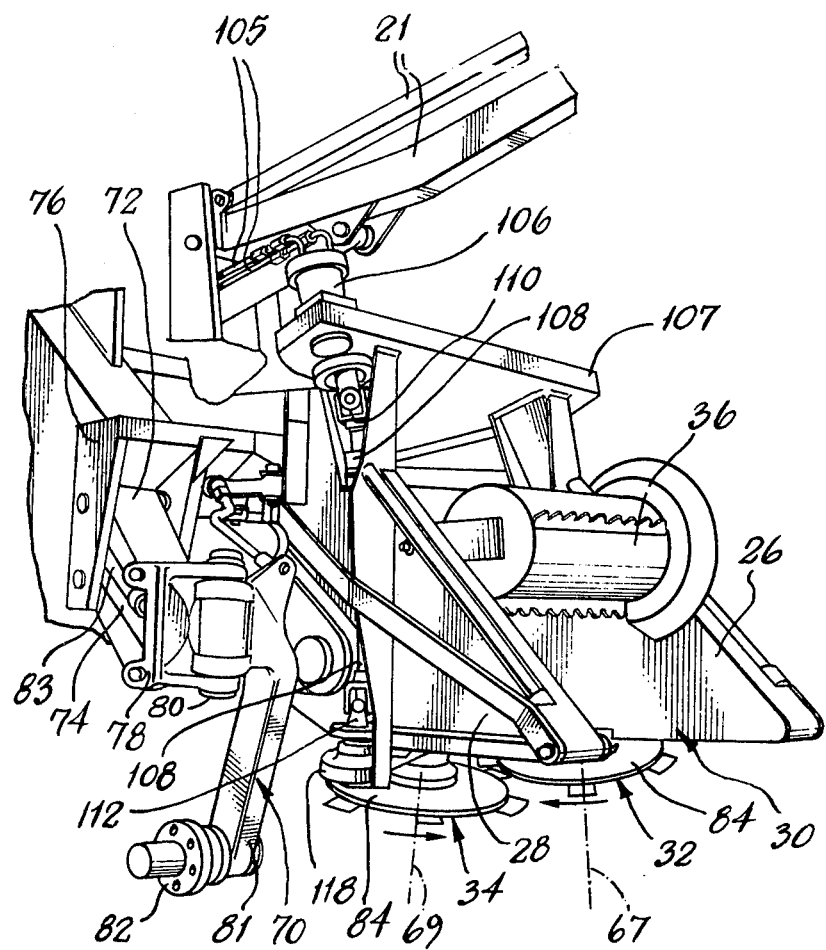
FIG. 3 shows a perspective view of the front of the harvester as indicated by arrow III in FIG. 2, with the same components removed.

ground-engageable support means in the form of rear traction wheels 12 and forward steerable wheels 14, all the wheels having pneumatic tires;

a control cab 16 for the driver;

a housing 18 at the rear of the harvester for a turbocharged diesel engine;

a radiator and fan and air cleaner assembly 19 to cool the engine;

cane topping apparatus 20 mounted on a linkage 21, to remove the tops from standing sugar cane;

cane lifting and gathering apparatus 22 comprising a pair of rotatable crop lifting augers 24 mounted one above each of a pair of transversely spaced crop gathering walls 26, 28 defining a crop gathering throat 30 (see FIGS. 2 and 3);

a pair of rotatable base cutters 32, 34 positioned to sever sugar cane sticks from their roots as a row of cane passes into the crop gathering throat;

stick feeding rollers comprising paddle rollers 36, 38 to feed the sticks towards and over the base cutters, a butt lifter roller 40 to raise the butt ends of the sticks as they leave the base cutters, and two pairs of feeding and cleaning rollers 42, 44 and 46, 48;

a forwardly tapering fixed sill plate 49 (see FIG. 2) positioned between the base cutters 32, 34 and butt lifter roller 40. The sill plate lies close-to and below the base cutters and the butt lifter roller and serves to support the severed butt ends of the sticks as they pass to the butt lifter roller, a pair of contra-rotatable cane chopping drums 50, 52 each having a pair of axially-extending and outwardly projecting blades. the blades of the two drums being arranged to co-operate in pairs of chop the cane sticks into billets about 30 centimeters in length;

a primary chain and slat elevator conveyor 54 positioned to receive at its inlet end 56 the billets from the chopping drums 50, 52 and to carry the billets to its discharge end 58;

a secondary chain and slat elevator 60 having an inlet hopper 62 positioned to receive billets from conveyor 54 and having a discharge end 64 from which billets fall into transport vehicles (not shown); and primary and secondary sets of trash removal apparatus 66, 68 respectively, each comprising an extractor fan and positioned to remove cane leaves and other light matter from the cascade of billets leaving the discharge ends 58 and 64 of elevators 54 and 60.

Base cutters 32, 34 are rotatable about respective upwardly-extending axes 67, 69 which (as shown in FIG. 1) lie in a common plane extending transverse to the direction of forward motion of the harvester. The axes 67, 69 converge upwardly, as shown in FIG. 2. As will be explained below, the degree of convergence can be adjusted.

The position of axes 67, 69 in relation to the front wheels 14 of the harvester is shown in FIG. 1. The axes lie between (as viewed in a direction at right angles to the direction of forward travel of the harvester) the front wheels 14 and thus the base cutters are of such a size and so positioned that they do not foul the pneumatic tires of wheels 14.

The suspensions 70 for the front wheels 14 are identical. As shown in FIG. 3, each comprises a pair of forwardly extending parallel suspension arms 72, 74 each pivotally connected at its rear end to a support structure 76 fast with the framework of the harvester. A steering bracket 78 is pivotally mounted on the forward ends of the suspension arms and carries an upwardly-extending steering pivot pin 80 on which a wheel mounting 81 having wheel bearings 82 is pivotally secured.

A pair of hydraulic rams 83 are connected one to the lower suspension arm of each suspension 70, to raise or lower the forward end thereof and hence raise or lower the wheels 14 relative to the remainder of the harvester. It will be appreciated that this alters the cutting height of base cutters 32, 34. Rams 83 are located between their respective suspension arms 72, 74.

Base cutters 32, 34 each comprise an annular blade-supporting member 84 having a series of radially outwardly projecting blades 85 secured thereto at its periphery by square-necked bolts 86 and associated nuts. Annular supporting member 84 is secured by a series of square-necked bolts 87 to a control hub plate 88. Each blade 85 has chamfered cutting edges 89 and fits into a slot defined between annular member 84 and a shallow channel-shaped member 90 welded to the underside of annular member 84. A series of holes 92 is formed in each blade to enable it to be position-adjusted outwards when it becomes worn down after use. In this way the desirable overlap of the cutting circles 94 (defined by the radially outermost cutting portions of each base cutter) can be maintained.

FIG. 7 shows an alternative blade arrangement in which the blades 96 are somewhat longer and are swept back with respect to the direction D of rotation of the base cutter. The blade supporting member 98 is smaller than in the FIG. 6 arrangement, leaving a longer exposed sharpened cutting edge 100 of the blade between the periphery of blade supporting member 98 and the cutting circle 102. The blades 96 are each clamped between blade supporting member 98 and hub plate 88 in a slot formed in these members. The inner end 104 of each blade engages the rear edge of the blade preceding it.

The drive for the base cutters will now be described.

A pump (not shown) driven by the harvester's diesel engine supplies hydraulic fluid through hoses 105 to an hydraulic motor 106 (see FIG. 3) mounted above the right hand crop gathering wall 28. Motor 106 is coupled to a transverse chain and sprocket drive housed in a casing 107. A pair of downwardly extending drive shafts 108 are positioned one at each outer side of the crop gathering walls. Shafts 108 have universal joints 110, 112, one at each end, by which they are coupled to the chain and sprocket drive in casing 107 and to respective upstanding drive input stub shafts 114 (see FIG. 5), one on each of a pair of gearboxes or transmission housings 116, 118. The gearboxes are provided one immediately above each of the base cutters 32, 34 respectively. The gearboxes each extend laterally with respect to the crop gathering throat underneath their respective crop gathering walls 26, 28 and transmit drive directly to the rotatable blade-supporting members 84, as will be described.

Each of the gearboxes 116, 118 houses a train of drive transmission elements in the form of three intermeshing spur gear wheels 120, 122, 124 and forms a liquid-tight container for lubricant for these gear wheels.

Spur gears 120, 122 and 124 are journalled on bearings 126, 128 and 130 respectively for rotation about the upwardly-extending axes of shafts 114, 132 and 134, the latter shaft defining the base cutter axis of rotation 67.

Spur gear 120 is fast with the rotatable input stub shaft 114. Shafts 132 and 134 do not rotate. Spur gear 124 is formed with an annular downwardly-projecting collar 135 in which a lubricant-retaining cap 136 fits. Collar 135 is formed with a series of screw-threaded apertures to receive bolts 138 whereby hub plate 88 is fastened thereto. A pair of annular lubricant-retaining seals 140 engage collar 135. A further seal, 142, is provided for input stub shaft 114.

As can be seen from FIGS. 2, 5, 8 and 9, each of the gearboxes 116, 118 has a relatively flat profile. That is to say, the vertical depth 144 of each gearbox measured at its innermost end 146 is small enough to ensure that the gearbox does not significantly obstruct the flow of cane into the harvester. The depth 144 of the gearbox should, for this purpose, not exceed 7.5 centimeters and preferably should be less than 7 centimeters. Each gearbox has a replaceable wear plate 147 secured by set screws to its upper surface at its exposed inner end.

Figure 4:
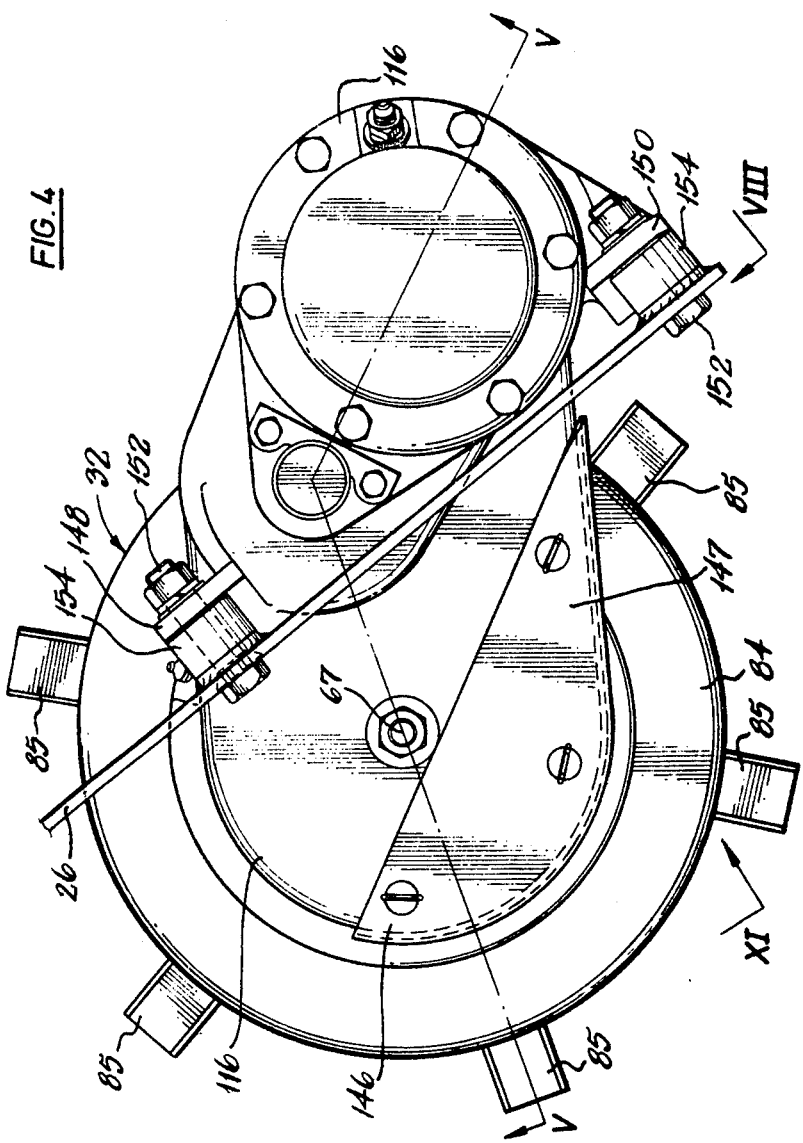
FIG. 4 shows a plan view of base cutting means of the harvester as indicated by arrow IV in FIG. 2.

FIGS. 4, 8 and 9 show the manner in which gearboxes 116, 118 are supported. Each gearbox is formed with a pair of upstanding brackets 148, 150 apertured to receive fasteners in the form of bolts 152, whereby the gearbox is secured to a support structure constituted by its respective crop gathering wall 26 or 28. A pair of apertured shims 154 are sandwiched between brackets 148, 150 and side wall 26. With shims 154 in position as shown, blades 85 of the basecutters rotate in a common horizontal plane. By removing the shims or substituting thinner ones, the gearboxes can be tipped downwards towards each other. This attitude adjustment facility allows the base cutters to accommodate cane growing on ridges or between ridges.

In use, hydraulic motor 106 causes base cutters 32, 34 to contrarotate and blades 84 sever the cane sticks from their roots. The severed butt ends of the cane sticks pass rearwardly some over and some between the blade-supporting discs 84 of the base cutters and onto sill plate 49. The butt ends of the sticks then engage butt lifter roller 40 which is formed with a series of stick gripping grooves and which lifts the butt ends so that they pass over it and onwards towards the cane chopping drums 50, 52.

When the harvester transverses uneven or undulating ground, particularly where drainage channels are formed across the rows of cane, the front and rear wheels of the harvester successively pass into and out of each depression in the ground thereby changing the attitude of the harvester relative to the ground surface.

However, because the base cutters 32, 34 are located directly between the front wheels 14 of the harvester, and in particular because the zone in which they effect cutting (i.e. where the cutting circles defined by the tips of their blades overlap) lies almost directly below the axis of rotation of wheels 14, the level at which the cane sticks are cut is always determined precisely by the height of wheels 14 — irrespective of the attitude of the cane harvester as a whole. Therefore the harvester can operate at high speed on rough ground (e.g. ground including cross drains) while maintaining accurate base cutter height control — as determined by the harvester's front wheels.

This is a considerable advantage because the highest concentration of sugar is found in the cane stick portions at ground level and if the sticks are cut too high a significant proportion of the available sugar is lost. On the other hand if the sticks are cut too low the power demands made by the basecutters become excessive, and unacceptable quantities of earth and stones enter the harvester with the crop.

Such variations in cutting height cannot be avoided with base cutters mounted in front of or behind the harvester's front wheels because any change in the harvester's attitude with respect to the ground will move such base cutters towards or away from the ground thereby changing the level of cut.

The relatively flat profiles of gearboxes 116 and 118 ensure that there is a minimum of impediment to the free flow of cane sticks through the crop gathering throat defined by walls 26, 28, despite the location of the axes of rotation of the base cutters 32, 34 within the throat.

It is to be understood that the invention is not limited to the use of wheels to support the front end of the harvester. Other ground-engageable support means such as tracks could be used.

Among other modifications which could be made in the above embodiment which are within the scope of the invention are the use of a chain and sprocket drive or a shaft and bevel gear drive within the transmission housings above the base cutters. Also the transmission housings could be positioned below the base cutters to drive them from below.

In the above embodiment, the centers of the two base cutters lie directly below a line joining the centres of the steerable wheels 14. This allows the maximum base cutter size to be employed without causing the basecutters to foul the wheels 14 when the wheels are fully turned to the right or left. However, the invention is not limited to this central position and the base cutters can be positioned somewhat forwardly or somewhat rearwardly therefrom.

Preferably there should be minimum overlap of the base cutters' cutting circles so that the zone where cane cutting actually occurs is as near as possible to a line joining the centres of the basecutters.

I claim:

1. A mobile sugar cane harvester including a frame; a pair of transversely spaced generally vertical fore and aft walls on the frame defining a crop gathering throat at the front of the harvester; ground engaging support means mounted on each side of the frame adjacent the crop gathering throat; a first rotatable base cutter including a first base cutter gear box mounted on the frame adjacent one of said walls and between said ground engaging support means, an upwardly and forwardly inclined blade support shaft journaled in the first base cutter gear box and inside the crop gathering throat, a first blade support mounted on the blade support shaft journaled in the first base cutter gear box, a plurality of projecting blades attached to the first blade support for severing sugar cane sticks from their roots as the harvester moves forward over a row of cane, drive means in the first base cutter gear box for driving the blade support shaft journaled in the first base cutter gear box to rotate the blades attached to the first blade support in a first circular path, and drive means outside the throat for driving the drive means in the first base cutter gear box; a second base cutter gear box mounted on the frame adjacent the other of said walls, opposite the first base cutter gear box and between said ground engaging support means, an upwardly and forwardly inclined blade support shaft journaled in the second base cutter gear box and inside the crop gathering throat, a second blade support mounted on the blade support shaft journaled in the second base cutter gear box, a plurality of projecting blades attached to the second blade support for severing sugar cane sticks from their roots as the harvester moves forward over a row of cane, drive means in the second base cutter gear box for driving the blade support shaft journaled in the second base cutter gear box to rotate the blades attached to the second blade support in a second circular path which intersects the first circular path, and drive means outside the throat for driving the drive means in the second base cutter gear box; and timing means for timing the second blade support relative to the first blade support to prevent the blades from striking each other.

2. The mobile sugar cane harvester of claim 1 wherein the first and second gear cases both include a portion which extends generally horizontally into the crop gathering throat from the walls and the blade support is mounted on the blade support shaft adjacent the bottom of the portion of the base cutter gear box which extends generally horizontally into the crop gathering throat.

3. The mobile sugar cane harvester of claim 1 wherein the drive means in each of the gear cases includes a train of gears rotatable about axes parallel to the axis of rotation of the blade support shaft.

4. The mobile sugar cane harvester of claim 3 wherein said train of gears runs in oil.

5. The mobile sugar cane harvester of claim 1 wherein at least one shim is included between each base cutter gear box and the frame to position the blade supports.

6. The mobile sugar cane harvester of claim 1 wherein the drive means in each base cutter gear box includes an input drive shaft extending from the base cutter gear box and the drive means outside the throat for driving the drive means in each of the base cutter gear boxes includes a drive shaft connected to the input drive shaft extending from each of the base cutter gear boxes by a universal joint.

7. The mobile sugar cane harvester of claim 1 wherein the vertical depth of the portions of the base cutter gear boxes that extends into the crop gathering throat is less than seven and one half centimeters.

8. The mobile sugar cane harvester of claim 1 wherein the ground engaging support means mounted on each side of the frame adjacent the crop gathering throat includes a pair of parallel suspension arm pivotally connected at one end to the frame, a steering bracket pivotally mounted on the free ends of the pair of parallel suspension arms, an upwardly extending steering pivot pin supported by the steering bracket and a wheel rotatably mounted on the steering bracket.

9. The mobile sugar cane harvester of claim 8 wherein a hydraulic actuator is attached to each of the ground engaging support means mounted on the side of the frame adjacent the crop gathering throat and to the frame to pivot the parallel suspension arms relative to the frame thereby adjusting the height of the blade supports relative to the ground.

10. The mobile sugar cane harvester of claim 1 wherein the forward edge of a portion of each base cutter gear box extends into the crop gathering throat and to the rear from the adjacent wall on the frame defining a crop gathering throat.

* * * * *